United States Patent
Ljung et al.

(10) Patent No.: US 12,149,989 B2
(45) Date of Patent: Nov. 19, 2024

(54) COMMUNICATION IN CELLULAR NETWORKS COMPRISING DYNAMIC CELLS

(71) Applicant: Sony Group Corporation, Tokyo (JP)

(72) Inventors: Rickard Ljung, Helsingborg (SE); Basuki Priyanto, Lund (SE); Daniel Lönnblad, Genarp (SE)

(73) Assignee: SONY GROUP CORPORATION, Tokyo (JP)

( * ) Notice: Subject to any disclaimer, the term of this patent is extended or adjusted under 35 U.S.C. 154(b) by 383 days.

(21) Appl. No.: 17/439,370

(22) PCT Filed: Apr. 9, 2020

(86) PCT No.: PCT/EP2020/060175
§ 371 (c)(1),
(2) Date: Sep. 14, 2021

(87) PCT Pub. No.: WO2020/216630
PCT Pub. Date: Oct. 29, 2020

(65) Prior Publication Data
US 2022/0182889 A1  Jun. 9, 2022

(30) Foreign Application Priority Data
Apr. 26, 2019 (SE) .................... 1930139-9

(51) Int. Cl.
*H04W 84/06* (2009.01)
*H04W 36/00* (2009.01)

(52) U.S. Cl.
CPC ... *H04W 36/0009* (2018.08); *H04W 36/0058* (2018.08); *H04W 36/00837* (2018.08); *H04W 84/06* (2013.01)

(58) Field of Classification Search
CPC ......... H04W 36/0009; H04W 36/0058; H04W 36/00837; H04W 84/06; H04W 36/0088
See application file for complete search history.

(56) References Cited

U.S. PATENT DOCUMENTS 9,503,918 B2    11/2016  Han
10,342,038 B2*  7/2019   Sun ..................... H04W 72/23
(Continued)

FOREIGN PATENT DOCUMENTS

CN    101390343 A    3/2009
CN    108353346 A    7/2018
(Continued)

OTHER PUBLICATIONS

International Search Report and Written Opinion from corresponding International Application No. PCT/EP2020/060175, Jul. 13, 2020, 14 pages.

(Continued)

*Primary Examiner* — Atique Ahmed
(74) *Attorney, Agent, or Firm* — Tucker Ellis LLP

(57) ABSTRACT

The present application relates to methods of operating a UE (201-204) and operating access nodes (101-103) of a cellular network (100). A method comprises receiving control information from a cellular network (100). The cellular network (100) comprises a dynamic cell. The control information is indicative of one or more availability parameters of the dynamic cell. The method furthermore comprises configuring the communication between the UE (201-204) and the cellular network (100) based on the control information.

18 Claims, 4 Drawing Sheets

(56) References Cited

U.S. PATENT DOCUMENTS

| | | | |
|---|---|---|---|
| 2007/0180320 A1* | 8/2007 | Poyhonen | H04W 48/08 714/31 |
| 2013/0272132 A1* | 10/2013 | Heo | H04W 4/70 370/236.2 |
| 2014/0099955 A1* | 4/2014 | Nukala | H04W 36/36 455/436 |
| 2015/0382258 A1 | 12/2015 | Schmidt | |
| 2017/0055185 A1* | 2/2017 | Chaudhuri | H04W 36/0061 |
| 2017/0311295 A1* | 10/2017 | Soldati | H04W 72/04 |
| 2017/0331670 A1* | 11/2017 | Parkvall | H04B 7/0695 |
| 2018/0063736 A1* | 3/2018 | Sadeghi | H04W 24/10 |
| 2018/0110057 A1* | 4/2018 | Park | H04W 74/0808 |
| 2019/0245657 A1* | 8/2019 | Lee | H04W 80/02 |
| 2019/0335361 A1* | 10/2019 | Lee | H04W 28/065 |
| 2019/0394786 A1* | 12/2019 | Parron | H04W 4/46 |
| 2020/0214006 A1* | 7/2020 | Choi | H04L 1/0006 |

FOREIGN PATENT DOCUMENTS

| | | |
|---|---|---|
| IN | 201837026120 A | 8/2018 |
| KR | 101529131 B1 | 7/2015 |
| WO | WO-2017194245 A1 | 11/2017 |

OTHER PUBLICATIONS

Alcatel-Lucent et al.,"System design for transition time reduction and legacy UEs impacts for small cell ON/OFF," 3GPP TSG RAN WG1 Meeting #76, R1-140161, Feb. 10-14, 2014, 14 pages.

* cited by examiner

COMMUNICATION IN CELLULAR NETWORKS COMPRISING DYNAMIC CELLS

TECHNICAL FIELD

Various examples of the invention generally relate to operating a wireless communication device in a cellular network comprising a dynamic cell. Further examples relate to operating an access node of the cellular network.

BACKGROUND OF THE INVENTION

In a cellular network, for example a cellular communication network as defined in the 3rd Generation Partnership Project (3GPP) in 3G, 4G and 5G standards, a plurality of cells may be defined for covering a certain area in which communication services may be provided (e.g., referred to as coverage area). Each cell may be provided by at least one access node assigned to the cell.

The cellular network may comprise dynamic cells. A dynamic cell may be dynamic in space, i.e., the dynamic cell may be moving thus changing the geographic area being served by the dynamic cell. Alternatively or additionally to such spatially dynamics of a dynamic cell, a dynamic cell may be dynamic in time domain, i.e., the dynamic cell can be available for a limited time duration, for example according to a predefined schedule or until a predefined expiration time.

For example, a dynamic cell may be provided by an access node arranged on the vehicle, for example on a car, a train, a bus, a ship, an aircraft or an Unmanned Aerial Vehicle (UAV) like a drone. From the wireless communication perspective, using a base station on board of a UAV, a so-called UAV base station (UBS) may be advantageous to enhance coverage in the variety of scenarios, for example public safety purposes, emergency situations, temporary coverage for mobile users in crowded places, for example during sports events or open air concerts. An UBS may be deployed easily and fast and may have a large coverage capability. For example, the UBS may hover in an altitude of around 100 m and may act either as a base station or as a relay. Considerations concerning a UBS can be found for example in the "Study on Enhancement for Unmanned Aerial Vehicles" of the 3GPP TR 22.829 V1.0.0 (2019-03) Stage 1 (Release 17).

However, a dynamic cell within the cellular network may raise problems due to its dynamic behavior, for example, the dynamic cell may cause excessive handovers of wireless communication devices (terminals or sometimes referred to as user equipment, UEs). The dynamic cell may cause significant handover control in a control plane of the cellular network when terminating its base station functionality.

SUMMARY OF THE INVENTION

Therefore, there is a need of advanced techniques for implementing communication in a cellular network comprising dynamic cells. Specifically, there is a need for techniques, which overcome or mitigate at least some of the above identified drawbacks.

This need is met by the features of the independent claims. The features of the dependent claims define embodiments.

A method of operating a UE comprises receiving control information from a cellular network. The cellular network comprises a dynamic cell. The control information is indicative of one or more availability parameters of the dynamic cell. The method further comprises configuring a communication between the UE and the cellular network based on the control information.

A computer program on a computer-readable storage medium includes program code. The program code can be executed by a control circuitry. Executing the program code causes the control circuitry to perform a method of operating a UE. The method includes receiving control information from a cellular network. The control information is indicative of one or more availability parameters of the dynamic cell. The method further includes configuring the communication between the UE and the cellular network based on the control information.

A method of operating an access node of a dynamic cell of a cellular network comprises transmitting control information to one or more UEs. The control information is indicative of one or more availability parameters of the dynamic cell.

A computer program on a computer-readable storage medium includes program code. The program code can be executed by a control circuitry. Executing the program code causes the control circuitry to perform a method of operating an access node of a dynamic cell of a cellular network. The method comprises transmitting control information to one or more UEs. The control information is indicative of one or more availability parameters of the dynamic cell.

A method of operating a further access node of a cell of a cellular network comprises obtaining control information from an access node of a dynamic cell of the cellular network. The control information is indicative of one or more availability parameters of the dynamic cell.

A computer program on a computer-readable storage medium includes program code. The program code can be executed by a control circuitry. Executing the program code causes the control circuitry to perform a method of operating a further access node of a cell of a cellular network. The method comprises obtaining control information from an access node of a dynamic cell of the cellular network. The control information is indicative of one or more availability parameters of the dynamic cell.

A method of operating a further access node of a cellular network comprises transmitting to each of multiple UEs a corresponding handover command in accordance with availability parameters of a dynamic cell of the cellular network.

A computer program on a computer-readable storage medium includes program code. The program code can be executed by a control circuitry. Executing the program code causes the control circuitry to perform a method of operating a further access node of a cellular network. The method comprises transmitting to each of multiple UEs a corresponding handover command in accordance with availability parameters of the dynamic cell of the cellular network.

A method of operating a UE comprises receiving a handover command from a cellular network. The handover command triggers a handover from a dynamic cell to a further cell. Further according to the method, upon receiving the handover command, neighbor-cell measurements at least on the further cell are performed and the handover in accordance with the neighbor-cell measurements is performed.

A computer program on a computer-readable storage medium includes program code. The program code can be executed by a control circuitry. Executing the program code causes the control circuitry to perform a method of operating a UE. The method comprises receiving a handover command from a cellular network. The handover command triggers a handover from a dynamic cell to a further cell. Furthermore, the method comprises, upon receiving the handover command, performing neighbor-cell measurements at least on the further cell, and performing the handover in accordance with the neighbor-cell measurements.

A UE comprises control circuitry configured to receive control information from a cellular network. The cellular network comprises a dynamic cell. The control information is indicative of one or more availability parameters of the dynamic cell. The control circuitry is further configured to configure a communication between the UE and the cellular network based on the control information.

An access node of a dynamic cell of a cellular network comprises a control circuitry configured to transmit control information to one or more UEs. The control information is indicative of one or more availability parameters of the dynamic cell.

A further access node of a cell of a cellular network comprises control circuitry configured to obtain control information from an access node of a dynamic cell of the cellular network. The control information is indicative of one or more availability parameters of the dynamic cell.

A further access node of a cellular network comprises control circuitry configured to transmit to each of multiple UEs a corresponding handover command in accordance with availability parameters of a dynamic cell of the cellular network.

A UE comprises a control circuitry configured to receive a handover command from a cellular network. The handover command triggers a handover from a dynamic cell to a further cell. The control circuitry is further configured to perform neighbor-cell measurements at least on the further cell and to perform the handover in accordance with the neighbor-cell measurements upon receiving the handover command.

It is to be understood that the features mentioned above and those described in detail below may be used not only in the described combinations, but also in other combinations or in isolation without departing from the scope of the invention.

DETAILED DESCRIPTION OF EMBODIMENTS

Figure 1:
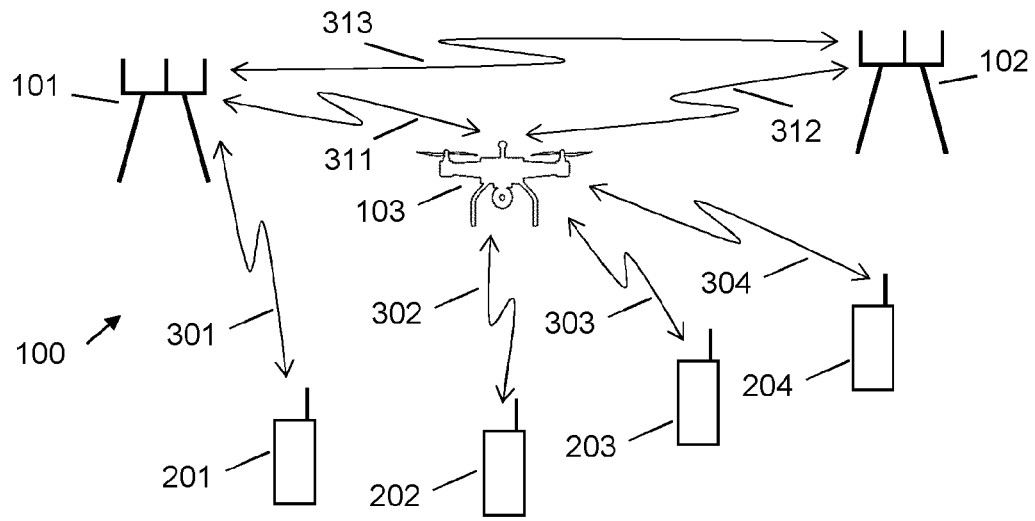
FIG. 1 shows schematically a cellular network system comprising a dynamic cell according to various examples.

In the following, embodiments of the invention will be described in detail with reference to the accompanying drawings. It is to be understood that the following description of embodiments is not to be taken in a limiting sense. The scope of the invention is not intended to be limited by the embodiments described herein or by the drawings, which are taken to be illustrative only.

The drawings are to be regarded as schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established via a wireless connection. Functional blocks may be implemented in hardware, firmware, software or a combination thereof.

Some examples of the present disclosure generally provide circuits or other electrical devices. All references to the circuits and other electrical devices and the functionality provided by each are not intended to be limited to encompassing only what is illustrated and described herein. While particular labels may be assigned to various circuits or other electrical devices disclosed, such labels are not intended to limit the scope of operation of the circuits and the other electrical devices. Such circuits and other electrical devices may be combined with each other and/or separated in any manner based on the particular type of electrical implementation that is desired. It is recognized that any circuit or any other electrical device disclosed herein may include any number of microcontrollers, a graphics processing unit (GPU), integrated circuits, memories (for example flash, random access memory (RAM), read only memory (ROM), electrically programmable read-only memory (EPROM), electrically erasable programmable read-only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of these functions as disclosed.

Hereinafter, techniques of wireless communicating using a communication system including two or more nodes are described. The nodes can implement a transmitter and receiver. For example, a communications system can be implemented by a communications network and a UE that can be connected or be connectable to the communications network. Hereinafter, techniques are described which facilitate transmission of signals by a UE comprising a wireless interface. The wireless interface includes a modem and one or more antenna ports connected to one or more antenna panels. As a general rule, the modem may include a digital front end and an analog front end.

The communications network (or, simply network) may be a wireless network. Various scenarios are described hereinafter with respect to an implementation of the communications network by a cellular network. The cellular network includes multiple cells. Each cell corresponds to a respective sub-area of the overall coverage area.

A cellular network may comprise a plurality of cells. Each cell may be provided by one or more access nodes related to the corresponding cell. Furthermore, a cell may be a dynamic cell or a non-dynamic cell.

A dynamic cell may have a variable availability in at least one of time domain and spatial domain. Thus, an active state—during which UEs can connect to a dynamic cell— may be only temporarily available or may be spatially variable. It is to be noted that for a specific UE a spatially variable cell may be perceived in the same way as the UE perceives a temporarily variable but spatially static cell—the spatially variable cell is temporarily available at a location where it covers the specific UE. For example, an access node assigned to a dynamic cell may be only temporarily active or may be movable, for example arranged on a vehicle like a train, a ship, a bus, a car or an UAV like a drone. By contrast, a non-dynamic cell may be stationary and at least planned to be unlimited available over time. In the following, a non-dynamic cell will also be called "stationary cell" or simply "cell". In the following, an access node, which provides a dynamic cell, will also be called dynamic access node, whereas an access node which provides a static cell will be also called static access node.

Various techniques are based on the finding that the presence of dynamic cells can impose challenges on the operation of the cellular network. For example, it has been found that handovers can occur more often due to the dynamic character of the dynamic cell. This can have various implications: firstly, the communication quality at the UE may degrade. Secondly, control-signaling overhead in a core network of the cellular network can increase. Consider a situation in which a dynamic cell to which multiple UEs are connected has a limited temporal availability, i.e., is dynamic in time domain. Here, a scenario may occur in which the multiple UEs have to perform a handover from the dynamic cell to another static cell essentially contemporaneously, i.e., at or towards the end of the availability of the dynamic cell. This can impose high signaling load and, furthermore, the great the communication quality at the UEs.

Various techniques are based on the finding that it can be helpful to create awareness of the dynamic character of a given dynamic cells at nodes of the cellular network and/or at UEs. According to various examples, control information is transmitted and/or received (communicated), wherein the control information is indicative of one or more availability parameters of the dynamic cell. Using the one or more availability parameters, it is possible to create awareness of the dynamic character of the dynamic cell. The one or more availability parameters can be associated with the time domain and/or spatial domain dynamics of the dynamic cell. For example, the one or more availability parameters could be indicative of one or more limitations in service provided by the dynamic cell due to the time domain and/or spatial domain dynamics of the dynamic cell.

As a general rule, such control information that is indicative of one or more availability parameters of the dynamic cell can be communicated on a radio link between an access node, e.g., the access node of the dynamic cell and/or another potentially static access node, and the UE. It would also be possible that such control information is communicated between two access nodes of a radio access network of the cellular network.

According to various examples, various actions may be taken based on such control information that is indicative of one or more availability parameters of the dynamic cell. For example, the communication between the UE and the cellular network can be configured based on the control information. This configuration can be implemented at the UE and/or at a node of the cellular network, e.g., an access node. For example, the UE can appropriately configure its connection to the cellular network, e.g., perform a prospective handover to a static cell in case the availability of the dynamic cell is limited due to its dynamics. For example, the UE could take actions in order to mitigate an impact on the communication quality, e.g., increase a buffer size of a service, e.g., a streaming service. Quality of service parameters may be adjusted appropriately. For example, inter-cell handovers may be prospectively triggered, e.g., to avoid congestion. For example, group handover commands may be used in order to reconnect multiple UEs from a dynamic cell to another cell. As will be appreciated from the above, the control information may be used for logic implemented at the UE and/or for a logic implemented at the network.

The information content of the control information can vary for various example implementations. To give a few examples: it would be possible that the one or more availability parameters of the control information include an indicator indicative of a temporary availability of the active state of the dynamic cell. I.e., it would be possible that the one or more availability parameters indicate that the cell is a dynamic cell, and not an active cell. This could be implemented by a 1-bit flag.

It would alternatively or additionally be possible that the one or more availability parameters include at least one of an expiry time or a timing schedule of the active state of the dynamic cell. Hence, quantitative information on timing constraints due to the time domain dynamics of the dynamic cell could be provided.

Alternatively or additionally to such timing constraints due to the time domain dynamics, it would also be possible to provide, by means of the control information, spatial constraints due to the spatial domain dynamics of the dynamic cell. For instance, it would be possible that the one or more availability parameters include at least one of a mobility-pattern of the dynamic cell or a location of the dynamic cell. The mobility pattern can describe, e.g., one or more of the following: average velocity; predicted velocity; velocity spread; predicted velocity spread; average height; predicted height; range of predicted height; heading; predicted heading; route information for a planned route; etc. The location could be in terms of latitude and longitudinal, e.g., in the WGS 84 coordinates.

As a general rule, it would be possible that such information on timing constraints and/or spatial constraints implies certain communication constraints of the dynamic cell. For example, there may be a tendency that a highly dynamic cell offers a smaller communication bandwidth—i.e., data throughput—than a less dynamic cell. For example, an access node of a dynamic cell may communicate via a radio backhaul with the cellular network. Therefore, a cumulated communication bandwidth of UEs communicating via this access node may be limited by the radio backhaul bandwidth. Further, an access node of a dynamic cell, e.g. arranged on a UAV, may have limited computing performance such that the maximum processable data rate may be limited. At least in some examples, it would also be possible that the one or more availability parameters include one or more communication constraints of the dynamic cell. Here, in other words, it would be possible to more explicitly indicate limitations of the one or more services provided by the dynamic cell to UEs. For example, these one or more communication constraints can include at least one of a data-throughput limitation or a transmit power limitation of the dynamic cell.

Various techniques are based on the finding that, sometimes, dynamic cells can impose significant signaling load, e.g., on a radio link and/or core network communication. For example, the transient availability of a dynamic cell can coherently affect a large number of UEs. Then, these UEs will tend to react in the same manner to the transient availability of the dynamic cell. For example, in case an access node of a dynamic cell will terminate operation at a specific point in time, a large number of UEs currently registered at or camping on this dynamic cell are coherently affected such that they have to register at another cell, for example a static cell or another dynamic cell. I.e., it can be expected that multiple UEs will essentially contemporaneously perform a handover from a dynamic cell to a static cell, or vice versa. This can cause peaks in the control signaling. The participating access nodes may experience congestion. Handovers may fail due to this, or be associated with significant latency. All this can deteriorate the communication quality.

To mitigate these issues, according to various examples, inter-access node coordination and/or inter-UE coordination of handovers can be implemented. In particular, for each of one or more UEs, a corresponding handover command can be communicated between the cellular network and one or more UEs in accordance with one or more availability parameters of the dynamic cell. Accordingly, it is possible to prepare the UEs for handover to avoid peaks in the control signaling. For example, the UEs may be instructed consecutively by consecutively transmitted handover commands to perform corresponding handovers. This may mitigate peaks in handovers and associated control signaling. In other examples, each of the handover commands may comprise a corresponding scheduling information assigning the UE a corresponding timing for handover. The sequence of consecutive handover commands as well as the scheduling information may be selected in accordance with the availability parameters, e.g. such that at the point of time when the availability of a dynamic cell ends, at least some or all involved UEs already have performed their handovers. Also, prospective notification can be given to the participating access nodes so that appropriate countermeasures, e.g., load-balancing or traffic shaping, can be employed.

In various examples, reference implementations of handover commands can be employed. Here, existing signaling techniques for handovers can be used. In other examples, novel signaling techniques of handover commands can be used. In particular, in some examples, it would be possible to use a group handover command that coherently addresses multiple UEs. For example, a single notification may be broadcasted including for example a list of addressed UEs and a timing information for a handover. The timing information may be selected in accordance with the availability parameters, e.g. such that at the point of time when the availability of a dynamic cell ends, at least some or all addressed UEs already have performed their handovers. The timing information may include a timing schedule indicating for each addressed UE a corresponding time for initiating the corresponding handover. Thus, peaks in handovers and associated control signaling may be avoided. The group handover command may be broadcasted by the dynamic cell to the multiple UEs. Further the group handover may be broadcasted using a single message or notification. Thereby the control signaling overhead for triggering the handover can be reduced.

As a general rule, various options are available for implementing logic associated with the coordinated handover functionality. Such logic may reside at an access node of a dynamic cell or at an access node of a static cell or at another node of the cellular network. For example, when a timer of the availability parameters indicates that a dynamic cell is about to expire, a handover functionality may be initiated for multiple UEs connected to the dynamic cell. For example, a group handover command may be used. At or close to the timer expiry of the dynamic cell, multiple UEs may be requested to perform handovers. The group handover command may be provided by either the dynamic cell or by anyone of the static cells.

For example, an active dynamic cell may communicate an upcoming group handover to the UEs registered at the dynamic cell by transmitting a group handover command to the UEs registered at the dynamic cell and/or provide a respective notification to further (e.g. static) cells in an environment of the dynamic cell. The control information may be provided using a handshake signal. For example, a response may be obtained, including a positive acknowledgement or a negative acknowledgement.

Upon expiry of, e.g., a timer of the dynamic cell or upon the access node of the dynamic cell is moving away, a handover of the UEs being registered at the dynamic cell may be performed such that the UEs register at or camp on at least one of the further (e.g. static) cells. For example, upon receiving the group handover command, the UEs may perform neighbor cell measurements, for example a static cell or another dynamic cell, and the handover to the further cell of the cellular network may be executed based on measurement results. The group handover command may be broadcasted such that signaling overhead may be reduced.

FIG. 1 illustrates a wireless communication system 100 that may benefit from the techniques disclosed herein.

The wireless communication system 100 may be a cellular network. The wireless communication system 100 includes one or more access nodes of the cellular network, for example two stationary access nodes 101 and 102 and a dynamic access node 103 providing a dynamic cell. The dynamic access node 103 may be provided at a drone. As the access nodes 101 to 103 are part of a cellular network, reference is also made to base stations (BS) hereinafter. However, in other types of communication systems, other types of access nodes may be employed.

A dynamic cell—implemented by the dynamic access node 103—may be utilized for example to handle temporary load variations or similar, for example during sports events and in emergency situations, particularly for public safety purposes.

A plurality of UEs may be operated in the cellular network 100. As shown in FIG. 1, a plurality of UEs 201 to 204 may be provided. Each of the UEs 201 to 204 may be in general one device of the following: a smart phone, a cellular phone, a desktop computer, a tablet computer, a notebook, a smart TV, an MTC device, an eMTC device, an IoT device, an NB-IoT device, a sensor, an actuator and so on.

Figure 2:
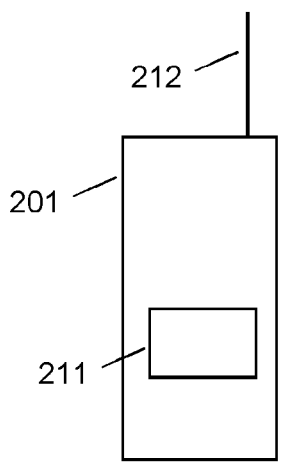
FIG. 2 schematically illustrates details of a UE of the cellular network system of FIG. 1.

FIG. 2 schematically shows the UE 201 in more detail. However, the other UEs 202 to 204 may have a similar or identical architecture. The UE 201 comprises a control circuitry 211 and an antenna panel 212 comprising one or more antennas. The control circuitry 211 may comprise for example a processor, a memory, a wireless interface, and/or one or more antenna ports coupled to the antenna panel 212.

The memory may be a non-volatile memory. The memory may store program code that can be executed by the processor. Executing the program may cause the processor to perform techniques with respect to: receiving control information from the cellular network 100, wherein the cellular network comprises a dynamic cell and the control information is indicative of one or more availability parameters of the dynamic cell; and configuring a communication between the UE 201 and the cellular network 100 based on the control information.

In further examples, executing the program code may cause the processor to perform techniques with respect to:

receiving a handover command from the cellular network 100. The handover command may comprise a group handover command, which may be addressed to a plurality of UEs. The handover command triggers a handover from a dynamic cell to a further cell; and, upon receiving the handover command, the program code may cause the processor to perform neighbor-cell measurements at least on the further cell, and to perform the handover in accordance with the neighbor-cell measurements.

Figure 3:
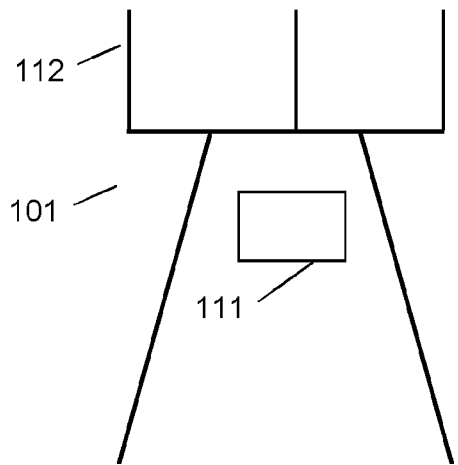
FIG. 3 schematically illustrates details of an access node of the cellular network system of FIG. 1.

FIG. 3 schematically illustrates more details of the static access nodes 101 and 102. In the following, reference will be made to access node 101. The access node 102 may have a similar or identical structure.

The static access node 101 is mounted on a concrete and/or steel tower, e.g., of a height of not less than 5 m. The static access node 101 could also be wall-mounted. The static access node 101 may be connected to a power grid or may have a fuel-driven generator. The static access node 101 may have a wired backbone connection to the core network; or a directional radio link connection to the core network; or a satellite connection to the core network.

The access node 101 comprises a control circuitry 111 and an antenna panel 112. The antenna panel 112 may comprise one or more antennas. The antennas of the antenna panel 112 may be located at the access node 101 or may be distributed over various locations at the access node 101 and/or spaced apart therefrom. The control circuitry 111 may comprise for example a processor, a memory, a wireless interface, one or more antenna ports coupled to the antenna panel 112, and an interface to a backbone network, for example to a telecommunications network or a data network like the Internet.

The memory may be a non-volatile memory. The memory may store program code that can be executed by the processor. Executing the program code may cause the processor to perform techniques with respect to: obtaining control information from an access node of a dynamic cell of the cellular network 100, for example from the dynamic access node 103. The control information is indicative of one or more availability parameters of the dynamic cell.

In further examples, executing the program code may cause the processor to perform techniques with respect to: transmitting a group handover command to multiple UEs in accordance with availability parameters of a dynamic cell of the cellular network. The multiple UEs may comprise for example the UEs 201 to 204. The dynamic cell of the network 100 may comprise for example the cell provided by the access node 103.

Figure 4:
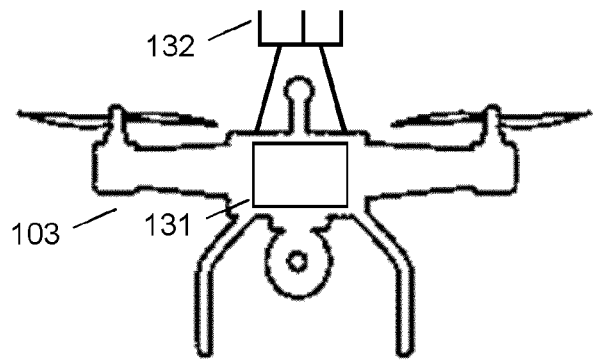
FIG. 4 schematically illustrates details of an access node of the dynamic cell of the cellular network system of FIG. 1.

FIG. 4 schematically illustrates the access node 103 of the cellular network 100 of FIG. 1 in more detail. The dynamic access node 103 may be configured to provide a dynamic cell.

The dynamic access node 103 may be mounted to a vehicle, e.g., a UAV. The dynamic access node 103 may be battery-powered. The dynamic access node 103 may be in a portable housing, e.g., not heavier than 1 kg or 5 kg or 10 kg. The dynamic access node 103 may have a non-directional radio link to the core network.

The access node 103 comprises a control circuitry 131 and an antenna panel 132. The antenna panel 132 may comprise one or more antennas. The control circuitry 131 may comprise for example a processor, a memory, a wireless interface, and one or more antenna ports coupled to the antenna panel 132. The wireless interface may be configured to communicate via the antenna ports and the antenna panel 132 with the UEs 201 to 204. Additionally, in some examples, the wireless interface may be configured to communicate with the access nodes 101, 102 of the cellular network 100. The access node 103 may provide a base station functionality. The access node 103 may be a movable device, for example arranged or integrated in a drone as shown in FIG. 4. In other embodiments, the access node 103 may be arranged at other vehicles, for example a ship, a train, a car, a bus, an aircraft and so on. A communication between the access node 103 and at least one of access node 101, 102 may comprise a concept for an Integrated Access and Backhaul (IAB) as it is defined for example in 3GPP. Details on the concept of IAB may be found In TR 38.874 of 3GPP standardization activities. According to IAB, a base station can receive its backhaul via the new radio (NR) access based on a wireless backhaul link in contrast to methods of a fixed fiber access or a wireless non-3GPP based access. It is to be noticed that with IAB there may be the case that same parts of the same spectrum are utilized for both the backhaul for the access node 103 and for the wireless link between access nodes 101 to 103 and the UEs 201 to 204.

The memory of the access node 103 may be of a non-volatile memory. The memory may store program code that can be executed by the processor. Executing the program code may cause the processor to perform techniques with respect to transmitting control information to one or more UEs, for example the UEs 201 to 204. The control information is indicative of one or more availability parameters of the dynamic cell provided by the access node 103.

Figure 5:
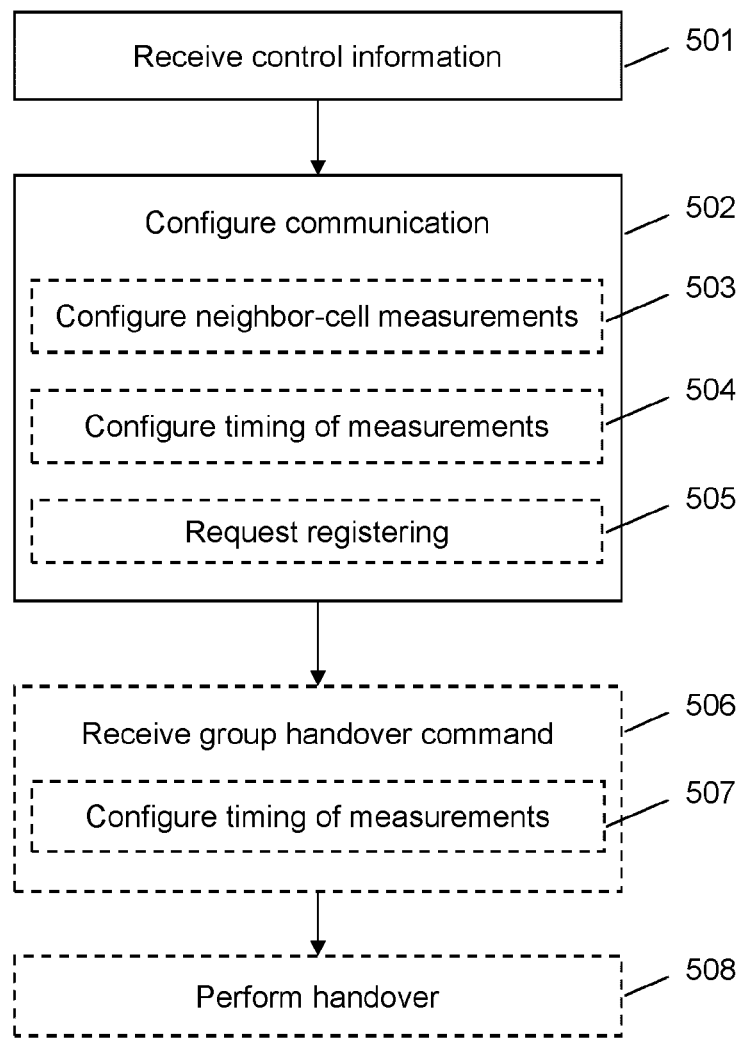
FIG. 5 is a flowchart of a method according to various examples, which may be performed by a UE.
Figure 6:
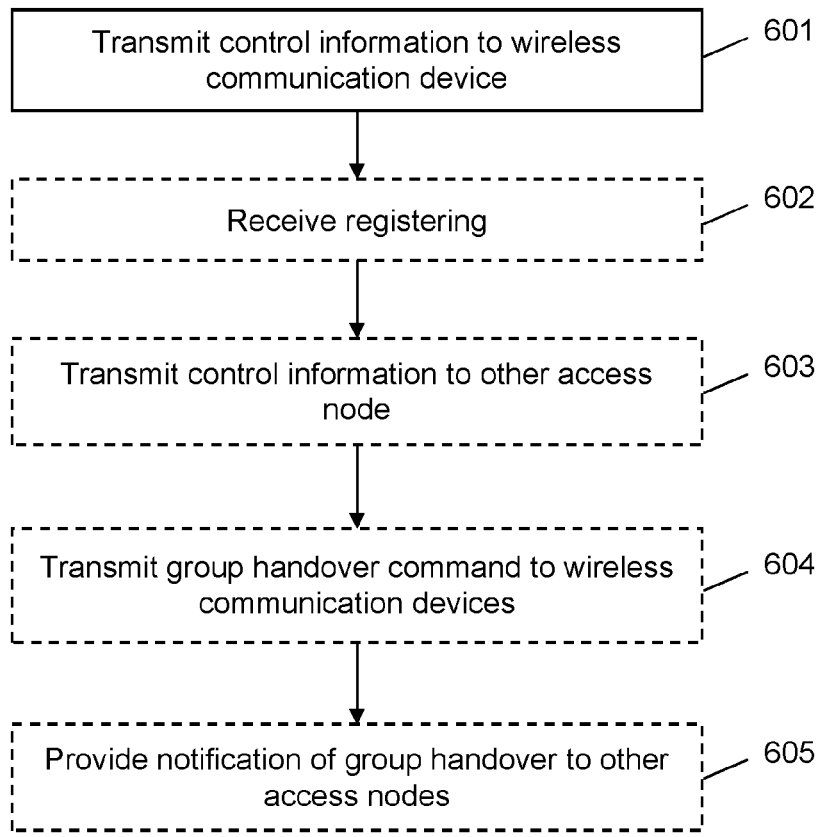
FIG. 6 is a flowchart of a method according to various examples, which may be performed by an access node of a dynamic cell.
Figure 7:
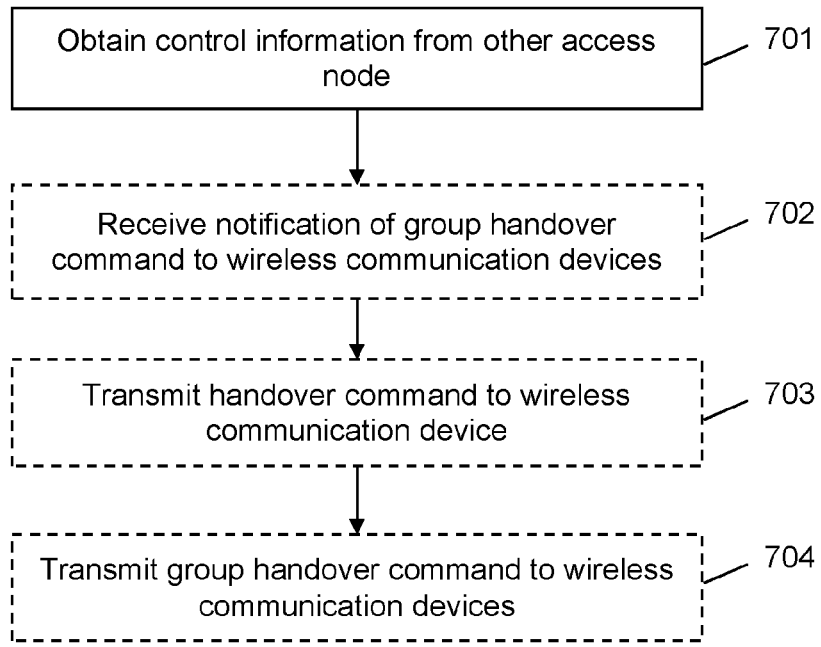
FIG. 7 is a further flowchart of a method according to various examples, which may be performed by an access node.

Operation and interworking of the access nodes 101, 102 and 103 and the UEs 201 to 204 will be explained in the following with respect to FIGS. 5 to 7, which show flowcharts of method steps performed by the access nodes 101 to 103 and the communication devices 201 to 204. In particular, FIG. 5 shows method steps which may be performed by any one of the UEs 201 to 204, FIG. 6 shows method steps which may be performed by the access node 103, and FIG. 7 shows method steps which may be performed by any one of access nodes 101 and 102. In the flowcharts, optional blocks are indicated by dashed boxes.

As discussed above, the access node 103 provides a dynamic cell, which means that this cell is not a static cell and may therefore not be permanently available to a UE. For example, access node 103 may be moving such that the area which is covered by this cell varies as a function of time. Furthermore, the cell provided by access node 103 may be available only for a certain amount of time, for example as long as a battery of a drone which carries the access node 103 can provide sufficient energy. In other examples, the access node 103 may provide the dynamic cell only according to a certain time schedule, for example only during a rush hour or a sports event.

When the dynamic cell provided by access node 103 is available, which means that the dynamic cell is in an active state and provides base station and/or relay functionalities, UEs may be able to detect broadcasted information transmitted by the dynamic cell, UEs can register at this dynamic cell and can communicate data via access node 103. For example, one or more UEs 202 to 204 may communicate via access node 103 as shown by links 302 to 304 in FIG. 1. Access node 103 may communicate with at least one of the stationary access nodes 101 and 102 as indicated by links 311 and 312 in FIG. 1. As further indicated by link 313, also the stationary access nodes 101 and 102 may communicate with each other (backbone connection). In particular, links 302 to 304 and 311 and 312 may be wireless links. However, a UE may also register directly at the stationary access notes 101 and/or 102. For example, as shown in FIG. 1, the UE 201 may register at the stationary access node 101 and may communicate via link 301 with the access node 101.

In view of the dynamic behavior of a dynamic cell, registering at and/or camping on a dynamic cell may be more appropriate for some UEs than for others. For example, registering at and/or camping on a dynamic cell provided by an access node arranged on a passenger transport bus may be well suited for a UE traveling along with the bus, but may be less appropriate for a UE being arranged (stationary) at a street the bus is traveling along. In another example, the access node 103 provided on a drone may provide a dynamic cell having limited communication bandwidth and a timely restricted availability. The access node 103 may be available only as long as sufficient electrical energy for operating the access node 103 is available from the batteries of the drone. A UE which requires only low data rates or which is currently in an idle mode may nevertheless register at and/or camp on the dynamic cell due to the close distance between the access node 103 and the UE such that an energy consumption of the UE may be reduced. However, when the dynamic cell becomes unavailable, a handover to another cell, for example a cell provided by the stationary access nodes 101 or 102 may need to be performed. In particular, when a large number of UEs has registered at the dynamic cell, a large number of handovers may be necessary when the dynamic cell becomes unavailable.

Therefore, as will be explained in more detail in the following, awareness of specific properties and limitations of a dynamic cell may be provided within the cellular network 100.

FIG. 5 is a flowchart of a method according to various examples. For example, the method of FIG. 5 can be executed by the UE 201, e.g., by a processor of the control circuitry 211 upon loading program code from a memory of the control circuitry 211.

At block 501 the UE 201 receives the control information that is indicative of one or more availability parameters of the dynamic cell. The dynamic cell is provided by the access node 103.

As a general rule, various options are available for communicating the control information. For example, the control information may be communicated on a broadcast channel, e.g., as part of a System Information Block (SIB). Also, multicast one-to-many communication would be possible. The control information could also be included in a Radio Resource Control (RRC) control message. For example, multiple UEs 201-204 may receive the control information.

The control information may include information to provide the awareness of specific properties and limitations of the dynamic cell provided by the access node 103. For example, the one or more availability parameters may comprise an indicator, which indicates a temporary availability of an active state of the dynamic cell. In other words, the availability parameter may indicate that the dynamic cell is currently in an active state, but that this active state is only temporarily available and does not last indefinitely as a usual static cell does. For example, the one or more availability parameters may comprise an expiry time of the availability of the dynamic cell. The expiry time may be indicated for example by time and date when the availability of the dynamic cell will end. Additionally or as an alternative, the expiry time may be indicated by a countdown timer counting down to the end of the availability of the dynamic cell. In other examples, the one or more availability parameters may comprise a timing schedule of an active state of the dynamic cell, which may indicate time ranges during which the dynamic cell is active, for example from 7 to 9 o'clock in the morning and from 3 to 7 o'clock in the evening each day, for example in case the dynamic cell is intended for covering increased data traffic during rush hours.

The one or more availability parameters may additionally or as an alternative comprise at least a mobility pattern of the dynamic cell. For example, the availability parameters may indicate a route along which the dynamic cell will move. For example, a bus or a train provided with an access node may indicate their routes along which they are going to travel. The mobility pattern may additionally include time information which indicates when the dynamic cell will be located at which location. In other examples, the one or more availability parameters may comprise the current location of the dynamic cell.

In further examples, the one or more availability parameters may comprise one or more communication constraints of the dynamic cell. For example, a data-throughput limitation of the dynamic cell and/or a transmit power limitation of the dynamic cell may be indicated in the availability parameters. These limitations can serve as upper thresholds or best-case scenarios.

At block 502, the UE 201 configures the communication with the cellular network based on the control information.

In the following, as an example, it is assumed that the UE 201 has successfully received the control information from the access node 103 in block 501. Upon receiving the control information, the UE 201 configures a communication between the UE 201 and the cellular network 100 based on the control information.

As a general rule, said configuring of the communication can depend on a comparison between the one or more availability parameters of the dynamic cell and one or more availability requirements of the UE 201. To give an example, a temporal communication schedule of the UE 201 could be compared with the timing schedule of the active state of the dynamic cell. To give a further example, a mobility pattern of the UE 201 could be compared with the mobility pattern of the dynamic cell.

For example, based on the control information, the UE 201 may selectively decide whether to request registering at the access node 103 or not. Registering at the access node 103 (block 505 in FIG. 5 and block 602 in FIG. 6) may comprise for example requesting to connect or camping on the dynamic cell. Instead of registering at the access node 103, the UE 201 may register at any other access node, for example at any one of the stationary access nodes 101 and 102.

Furthermore, based on the control information, the UE 201 may configure neighbor-cell measurements (block 503) and/or the timing of measurements (block 504). The neighbor-cell measurements may be performed by the UE 201 based on reference signals from one or more further cells of the cellular network 100 different from the dynamic cell, which is provided by the access node 103. For example, the neighbor-cell measurements may be performed by the UE 201 based on reference signals from cells provided by access nodes 101 and 102. The neighbor-cell measurements may be based on reference signals having a predefined signal shape and amplitude etc. The neighbor-cell measurement can include measurement reporting on an amplitude and/or phase of the received reference signal or other properties.

Configuring the neighbor-cell measurements may include, for example, configuring a timing of the neighbor-cell measurements. The timing may be defined with respect to an expiry time of an active state of the dynamic cell provided by the access node 103. For example, the timing may be defined relatively to an expiry time of the active state of the dynamic cell. The closer the expiry time of the active state of the dynamic cell comes, the more frequent the neighbor cell measurements may be performed.

For example, in case the UE 201 has registered at the dynamic access node 103, the UE 201 may configure its neighbor-cell measurements such to be prepared to perform cell reselections or handovers upon reaching the time when the dynamic cell of dynamic access node 103 will not be available anymore. Instead of performing neighbor-cell measurements only in case the signal level of the serving (dynamic) cell is deteriorating and below a certain threshold, neighbor-cell measurements may be performed when the end of the availability time of the dynamic cell comes closer. In this case the signal of the serving dynamic cell may still be sufficiently high. Nevertheless, the time until the dynamic cell becomes unavailable may be short. Therefore, by configuring neighbor-cell measurements and the timing thereof based on availability parameters, a handover to a neighboring cell may be initiated in good time before the dynamic cell becomes unavailable. Thus, peaks in handovers and control signaling may be mitigated. In another example, a repetition frequency of neighbor-cell measurements may be increased by the UE 201 the closer the expiry or inactivity time (unavailability) of the dynamic cell comes.

A handover command or a group handover command from the dynamic access node 103 or from one or more of the stationary access nodes 101 and 102 may be received at one or more of the UEs 201 to 204 in block 506.

It is generally possible that the group handover command is in accordance with one or more availability parameters of the dynamic cell 103. Corresponding logic at the cellular network 100 will be explained later in connection with blocks 604 and 703/704.

For example, the group handover command could include a list of identities associated with multiple UEs 201-204 and the UE 201 may check whether its identity is included in the list. It would also be possible that the group handover command includes a group identity and the UE 201 could match its identity with the group identity. Based on such actions, the UE 201 can judge whether the group handover command is applicable or not.

As a general rule, the group handover command can include identities of one or more candidate target cells. For example, the one or more candidate target cells could include the dynamic cell provided by the dynamic access node 103 or could also include identities of one or more static cells. In some examples, it would be possible that the group handover command includes an indicator indicative of whether the one or more candidate target cells are dynamic cells or static cells.

Then, in case the group handover command also addresses the UE 201, the UE 201 performs the handover at block 508, in accordance with the group handover command.

It would also be possible that receiving the group handover command triggers neighbor-cell measurements on one or more respective candidate target cells. Thus, more generally speaking, it would be possible that the group handover command prepares the UE 201 for the handover; but does not execute the handover immediately. Rather, the handover can be conditional depending on a result of the neighbor-cell measurements. For example, an appropriate target cell may be selected from the multiple candidate target cells in accordance with the result of the neighbor-cell measurements.

FIG. 6 is a flowchart of a method according to various examples. FIG. 6 can be executed by the access node 103 of the dynamic cell, e.g., by a processor of the control circuitry 131 upon loading program code from a memory of the control circuitry 131.

The access node 103 may transmit in block 601 control information to one or more UEs of the cellular network 100. Block 601 is inter-related to block 501. The control information is indicative of one or more availability parameters of the dynamic cell provided by access node 103. The control information may be broadcasted such that every UE within the radio range of the access node 103 may receive the control information. The control information may be transmitted within a System Information Block (SIB) as it may be defined in 3GPP communication standards. However, the control information may be transmitted as a separate specifically defined information block or in any other control or data block.

At block 602, the access node 103 receives a registration request from the UE 201. The UE 201 may then be registered at the access node 103.

In block 603 of FIG. 6, the access node 103 may provide the control information additionally to one or more further access nodes of one or more further cells of the cellular network 100, for example to access nodes 101 and 102. The further control information may indicate the one or more availability parameters. As a result, awareness of the presence of a dynamic cell within the cellular network 100 may also be created at other access nodes the cellular network 100. This awareness may be used by the access nodes of the cellular network 100 for coordinating handovers when the availability of the dynamic cell ends or a dynamic cell becomes available.

In accordance with the one or more availability parameters, a group handover may be initiated. As a general rule, various options are available for configuring the group handover. For example, the group handover could be from the dynamic cell to one or more further cells, e.g., static cells. It would also be possible that the group handover is to the dynamic cell, from one or more further cells. In any case, the group handover command can be in accordance with the one or more availability parameters of the dynamic cell. Hence, if it is assumed that the dynamic cell will continue to operate in the active state and/or will be reachable by various UEs for at least some time in the future, the group handover may be to the dynamic cell. On the other hand, if it is assumed that the dynamic cell will stop to operate in the active state and/or will not be reachable by various UEs in the future, the group handover may be away from the dynamic cell.

For example, the access node 103 providing the dynamic cell may transmit a group handover command to one or more UEs in block 604. In particular, access node 103 may transmit a group handover command to the UEs 201 to 204, which are currently registered at the dynamic cell or camping on the dynamic cell. Using a group handover (instead of multiple single handovers) may contribute to reduce control signaling overhead.

Furthermore, access node 103 may provide a notification of the group handover command transmitted to the one or more UEs to one or more further access nodes of one or more further cells of the cellular network 100 in block 605. For example, access node 103 may provide the notification concerning the group handover command to the stationary access nodes 101 and 102. Based on this notification, the one or more further access nodes can prepare for handovers. The notification may thus be a prospective notification (and block 605 may be executed prior to block 604). For example, the one or more further access nodes can implement load-balancing or traffic shaping in order to accommodate for the handovers. This helps to increase the communication quality and handover reliability.

FIG. 7 is a flowchart of a method according to various examples. For example, the method of FIG. 7 could be executed by an access node of a static cell, e.g., by the access node 101 (cf. FIG. 1). For example, the method of FIG. 7 could be executed by a processor of the control circuitry 111 of the access node 101, e.g., upon loading respective program code from a memory of the control circuitry 111.

In block 701, control information indicative of one or more availability parameters of the dynamic cell is obtained by the access nodes 101 from the access node 103 of the dynamic cell. Block 701 is thus inter-related to block 603.

The control information may be obtained using a handshake signal. For example, a response may be transmitted, including a positive acknowledgement or a negative acknowledgement.

Thus, a timer value, an expiry time, geographic information and/or other availability parameters of the dynamic cell may be shared between the dynamic cell and the stationary cells. The stationary cells may assign or allocate some of the UEs currently registered at the stationary cells to the dynamic cell. For example, based on the location information provided in the availability parameters, the stationary access nodes of the stationary cells may assign/allocate UEs within the range of the dynamic cell to the dynamic cell. The respective decision making may be based on a comparison between the one or more availability parameters of the dynamic cell with one or more availability requirements of the UEs. Respective techniques as already explained above can be applied.

Before a handover to the dynamic cell is performed, the UEs may perform neighbor cell measurements to validate whether the dynamic cell signal can be received at an adequate level.

The stationary access node 101 may obtain the notification of the group handover command, which was transmitted by the dynamic cell to one or more UEs, from the access node 103 of the dynamic cell in block 702. Block 702 is thus inter-related with block 605. Block 702 can include handshake signaling. A positive or negative acknowledgement may be provided in response to the notification.

In some examples, the notification of the group handover command may include a count of the UEs to which the group handover command is addressed.

The stationary access node 101 may optionally transmit one or more handover commands to one or more UEs based on the control information in block 703. Additionally or as an alternative, the one or more handover commands may comprise a group handover command, which is transmitted to the UEs in block 704. For example, this may be based on a comparison of one or more availability requirements of the UEs with one or more available parameters of the dynamic cell. To give an example, the dynamic cell provided by access node 103 which is currently not available or inactive, may communicate to further (neighboring) cells, for example the static cells provided by access nodes 101, 102, a time or location schedule when the dynamic cell will be available. Upon this availability parameters, access nodes 101 and 102 of the static cells may transmit a group handover command to UEs, which are currently registered at or camping on the static cells. The group handover command may request the UEs to configure a timing of neighbor cell measurements in block 507 such that the UEs may detect the dynamic cell upon availability of the dynamic cell and that the UEs may perform a handover to the dynamic cell in block 508. Additionally or as an alternative, the group handover command may indicate an identifier of the dynamic cell and/or a point of time for performing the handover to the indicated dynamic cell in block 508.

In general, a group handover may be initiated based on information concerning upcoming states of dynamic cells in the cellular network 100 as will be described in more detail in connection with FIG. 8 and FIG. 9 in the following.

Figure 8:
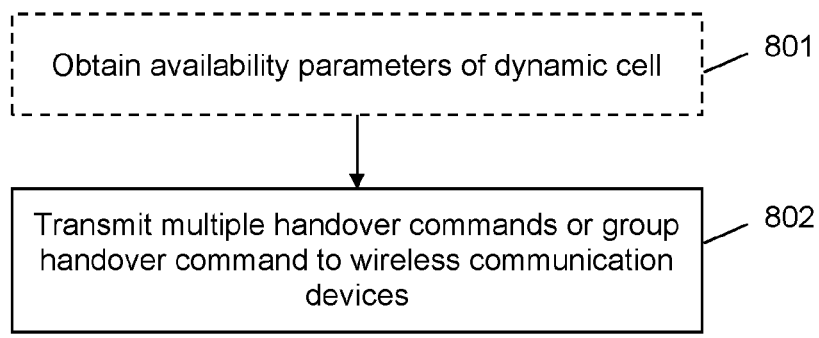
FIG. 8 is a flowchart of a method according to various examples, which may be performed by an access node.

FIG. 8 is a flowchart of a method according to various examples. The method of FIG. 8 could be performed by any stationary access node, for example by access node 101 or access node 102, e.g., by a processor of the control circuitry 111 upon loading respective program code from a memory of the control circuitry 111.

In block 801, the access node obtains availability parameters of a dynamic cell. As described above, the access node may obtain the availability parameters from the dynamic access node assigned to the dynamic cell, for example from access node 103. However, the access node may obtain the availability parameters in any other way, for example by configuration or by information received from a control node of the cellular network 100. In accordance with the availability parameters of the dynamic cell, the access node transmits multiple handovers or a group handover command to multiple UEs in block 802.

Figure 9:
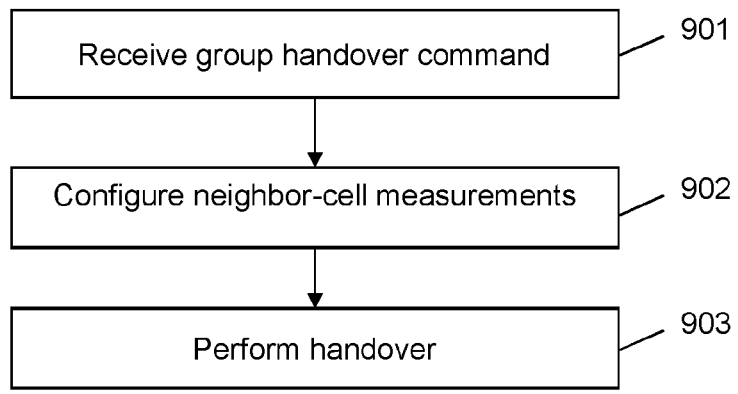
FIG. 9 is a flowchart of a method according to various examples, which may be performed by a UE.

FIG. 9 is a flowchart of an inter-related method which may be performed by a UE, for example any one of the UEs 201 to 204. For example, the method of FIG. 9 could be executed by a processor of the control circuitry 211, e.g., upon loading program code from the memory of the control circuitry 211. In the flowcharts, optional blocks are indicated by dashed boxes. FIG. 9 is inter-related with FIG. 8.

In block 901, at least one of the UEs 201 to 204 of the cellular network 100 receives a handover command—e.g., a group handover command—from the access node, for example from access node 101 or access node 102. The handover command may indicate for the respective UE to trigger a handover from a dynamic cell to at least one further cell. It would be possible that the handover command is indicative of multiple candidate target cells. The at least one further cell may generally comprise another dynamic cell or static cell. The multiple candidate target cells may also be arranged based on a priority order indicating a priority for selecting one of the multiple candidate target cells for handover.

Upon receiving the handover command, the corresponding UE may perform neighbor cell measurements at least on the at least one further cell in block 902 and perform the handover in block 903 in accordance with the neighbor-cell measurements. For example, the UE could perform neighbor-cell measurements on all or at least some of the candidate target cells, if a respective list is included in the handover command. The particular target cell may then be selected in accordance with the result of the neighbor-cell measurements. For example, the strongest radio link may define the target cell.

Hence, as will be appreciated, the execution of the handover is dependent on the neighbor-cell measurements (and not only on the handover command). For example, the UE could perform neighbor-cell measurements based on the priority order of the candidate target cells, e.g. as indicated in the handover command. As long as the neighbor-cell measurement result is above a threshold, e.g. not necessarily the strongest, then the UE can perform the handover to the respective target cell.

To sum up, control information for awareness of the spatial and/or temporary dynamic of a cell is added to the cellular network. This control information may indicate the remaining expected availability time, an availability timing schedule, a remaining time for a certain cell position and/or an expected spatial and temporary path of the dynamic cell. The control information may be used to control neighbor cell measurements of the UEs and perform handover prerequisites at dynamic and static cells of the cellular network.

Although the invention has been illustrated and described with respect to certain embodiments, equivalents and modifications will occur to others skilled in the art upon reading and understanding of the specification. The present invention includes all such equivalents and modifications and is limited only by the scope of the appended claims.

For illustration, various examples have been described in connection with a scenario in which control information that is indicative of one or more availability parameters of a dynamic cell is transmitted to a UE by the access node of the dynamic cell. In other examples, it would—alternatively or additionally—be possible that the control information is transmitted to a UE by another access node of another cell, e.g., of a static cell. For example, this may be helpful in scenarios in which the UE is to be prospectively informed about the one or more availability parameters, e.g., before the dynamic cell operates in the active state. It could also be helpful in scenarios in which the UE is connected to/camps on another cell, different from the dynamic cell. For example, respective control information for the dynamic cell may be obtained from a repository of the cellular network or from the dynamic cell via a backbone communication.

The invention claimed is:

1. A method of operating a wireless communication device, the method comprising:
   receiving control information from a cellular network, the cellular network comprising a dynamic cell that has a variable availability in at least one of a time domain and/or a spatial domain, the control information being indicative of one or more availability parameters of the dynamic cell, wherein the one or more availability parameters comprise an indicator indicative of a temporary availability in the time and/or spatial domain of an active state of the dynamic cell during which the wireless communication device and the dynamic cell may connect; and
   configuring a communication between the wireless communication device and the cellular network based on the control information.

2. The method of claim 1, wherein the one or more availability parameters comprise at least one of:
   an expiry time of the active state of the dynamic cell; and/or
   a timing schedule of an active state of the dynamic cell.

3. The method of claim 1, wherein the one or more availability parameters comprise at least one of:
   a mobility pattern of the dynamic cell; and/or
   a location of the dynamic cell.

4. The method of claim 1, wherein the one or more availability parameters comprise one or more communication constraints of the dynamic cell.

5. The method of claim 4, wherein the one or more communication constraints comprise at least one of:
   a data-throughput limitation of the dynamic cell; and/or
   a transmit power limitation of the dynamic cell.

6. The method of claim 1, wherein the configuring the communication comprises configuring neighbor-cell measurements.

7. The method of claim 6, wherein:
   the configuring the neighbor-cell measurements comprises configuring a timing of the neighbor-cell measurements,
   the timing of the neighbor-cell measurements is defined with respect to an expiry time of the active state of the dynamic cell.

8. The method of claim 1, wherein said configuring the communication comprises selectively requesting to connect or camping on the dynamic cell.

9. The method of claim 1, further comprising:
   receiving a group handover command from the cellular network, in accordance with the one or more availability parameters; and
   performing a handover to a further cell of the cellular network upon receiving the group handover command.

10. The method of claim 9, further comprising:
    upon receiving the group handover command:
        performing neighbor-cell measurements at least on the further cell.

11. A method of operating an access node of a dynamic cell of a cellular network, the method comprising:
    transmitting control information to one or more wireless communication devices, the control information being indicative of one or more availability parameters of the dynamic cell,
    wherein the dynamic cell has a variable availability in at least one of a time domain and/or a spatial domain,
    wherein the one or more availability parameters comprise an indicator indicative of a temporary availability in the time and/or spatial domain of an active state of the dynamic cell during which the one or more wireless communication devices and the dynamic cell may connect,
    wherein the control information may be used to configure a communication between the one or more wireless communication devices and the cellular network.

12. The method of claim 11, further comprising:
    providing further control information to one or more further access nodes of one or more further cells of the cellular network, the further control information being indicative of the one or more availability parameters.

13. The method of claim 11, further comprising:
    transmitting a group handover command to the one or more wireless communication devices, in accordance with the one or more availability parameters.

14. The method of claim 13, further comprising:
    providing a notification of the group handover command transmitted to the one or more wireless communication devices to one or more further access nodes of one or more further cells of the cellular network.

15. A method of operating a further access node of a cell of a cellular network, the method comprising:
    obtaining control information from an access node of a dynamic cell of the cellular network, the control information being indicative of one or more availability parameters of the dynamic cell,
    wherein the dynamic cell has a variable availability in at least one of a time domain and/or a spatial domain,
    wherein the one or more availability parameters comprise an indicator indicative of a temporary availability in the time and/or spatial domain of an active state of the dynamic cell during which a wireless communication device and the dynamic cell may connect,
    wherein the control information may be used to configure a communication between the wireless communication device and the cellular network.

16. The method of claim 15, further comprising:
obtaining a notification of a group handover command transmitted by the dynamic cell to one or more wireless communication devices in accordance with the one or more availability parameters.

17. The method of claim 15, further comprising:
selectively transmitting one or more handover commands to one or more wireless communication devices based on the control information.

18. The method of claim 17, wherein the one or more handover commands comprise a group handover command.

* * * * *